United States Patent [19]
Gunn

[11] Patent Number: 5,213,509
[45] Date of Patent: May 25, 1993

[54] LOVER'S GAME AND METHOD OF PLAY

[76] Inventor: John C. Gunn, 30417 Driftwood Dr., Gold Beach, Oreg. 97444

[21] Appl. No.: 620,689

[22] Filed: Dec. 3, 1990

[51] Int. Cl.$^5$ .......................................... G09B 19/00
[52] U.S. Cl. .................................. 434/236; 434/238
[58] Field of Search ...................... 434/236, 237, 238; 273/148 R, 292, 293, 294

[56] References Cited

U.S. PATENT DOCUMENTS

| | | | |
|---|---|---|---|
| 740,236 | 9/1903 | Cohen | 273/148 R |
| 1,114,523 | 10/1914 | Revell | 273/294 |
| 1,578,225 | 6/1924 | White | 434/238 |
| 2,520,321 | 8/1950 | McDonald | 273/148 R |
| 4,667,959 | 5/1987 | Pfeiffer | 273/149 R |
| 5,013,246 | 5/1991 | Doyle | 434/236 |

Primary Examiner—Gene Mancene
Assistant Examiner—Cindy A. Cherichetti
Attorney, Agent, or Firm—John J. Posta, Jr.

[57] ABSTRACT

The game for lovers includes two open-topped containers, with or without closeable top lids and central storage spaces, and a number of game pieces of sufficiently small size so that a number of the pieces can fit into each space. The total number of pieces in the game is more than enough to fill one of the spaces, but insufficient to fill both spaces. The game pieces are stored in the spaces throughout the game. The game may also include a rules guide. The game pieces can all be of the same or different size, shape and appearance, preferably the latter. Most preferably, they are in the form of different simulated jewels of various sizes, shapes and appearances. In one embodiment, the rules guide, containers and/or pieces bear the legend "lovers". The game is played by initially distributing an equal number of game pieces to each player for storage in the container spaces. Whenever a lover performs a loving act, he or she gives the other lover a game piece which is stored in the recipient's container space. When the pieces overflow a container that is the signal for the lover having that container to perform a sufficient number of loving acts and distribute the overflowing pieces to the other participant thus promoting harmony and exchanging and sharing of loving acts between the game lovers.

10 Claims, 1 Drawing Sheet

LOVER'S GAME AND METHOD OF PLAY

BACKGROUND OF THE INVENTION

1. Field of the Invention

The present invention generally relates to games and more particularly to a novel game which promotes domestic harmony.

2. Prior Art

Most games are physical, mental and/or recreational without primary regard for their psychological effects. Although piece of mind and relaxation may result as a by-product of such a game, whether it is an indoor or outdoor game, that is not the object of the game. Moreoever, most games have little, if any, moral content.

There remains a need for an indoor-outdoor game which promotes piece of mind, harmony between lovers and moral behavior. Thus, such a game should be simple, inexpensive, interesting, easy to play, satisfying and attractive, with promotion of tranquility and development of equitable behavior patterns. The game should involve as few steps as possible and provide means for easily discerning the status of the game as it progresses.

SUMMARY OF THE INVENTION

The improved lover's game of the present invention satisfies all the foregoing needs. The game is substantially as set forth in the Abstract of the Disclosure. Thus, it includes a pair of containers or loving cups with open tops and/or closeable lids, a plurality of small game pieces to place inside the central spaces in the cups, and preferably a rules guide. The pieces may all be of the same size, shape and color, or may be different one from another. Preferably, they are in the form of simulated jewels of different sizes, shapes and colors. The pieces total an amount which will more than fill one cup, but will be less than those necessary to fill both cups. Each of the pieces and/or cups and/or the rules guide may bear the indicia LOVE.

The game is played by initially dividing the number and types of pieces equally into two sets between the two lovers, so the two sets are identical and placing them into the cups. Then, so long as the game is played, whenever a loving act is carried out by one of the lovers, that lover, along with the act, gives the other lover a game piece which the recipient must store in his or her cup. When a cup is full to overflowing, the lover with the overflowing cup must (immediately) perform a loving act and at the same time pass to the other lover a game piece, thus relieving the overflow situation. This reminds the overflow lover of the laxity of his or her behavior and stimulates further loving acts in order to substantially reduce the number of pieces in the overflow cup and promote equality, balance and harmony between the lovers. The condition of the cups in terms of loving acts at any time can be told at a glance to remind the lovers that it is better to give than to receive and whether his or her actions have been generous or remiss.

Accordingly, the lover's game promotes harmony, tranquility and peace of mind, is morally uplifting and a continuing source of love and pride. Further features of the game are set forth in the following detailed description and accompanying drawings.

DRAWINGS

FIGS. 1a–1c are a first preferred embodiment of the improved lover's game of the present invention, showing a schematic perspective view of a rules guide and schematic side elevation, partly broken away, of a pair of containers containing game pieces; and, FIGS. 2a–2d are a second preferred embodiment of the improved lover's game of the present invention, showing a schematic perspective view of a rules guide, schematic side elevation of a plurality of game pieces and a schematic side elevation, partly broken away, of two lover's cups used in the game.

DETAILED DESCRIPTION

FIG. 1

Figure 1B:
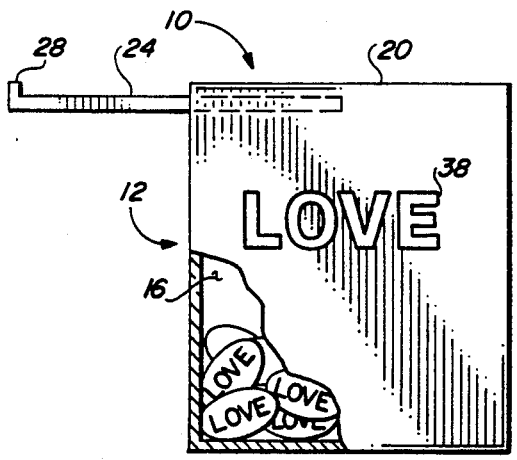
Figure 1C:
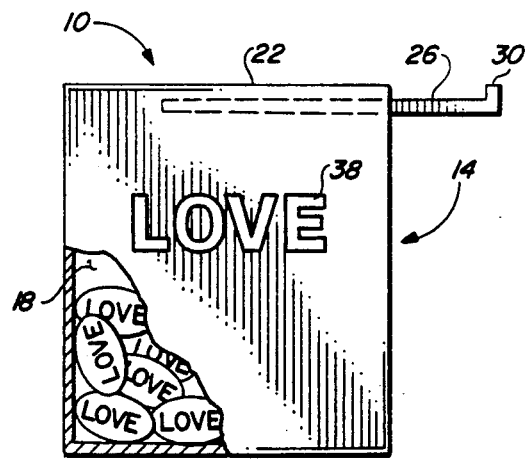

Now referring more particularly to FIG. 1 of the drawings, a first preferred embodiment of the improved lover's game of the present invention is schematically depicted therein. Thus, game 10 is shown which comprises a pair of open-topped square containers (FIG. 1(b) & (c)) 12 and 14, having central storage spaces 16 & 18, respectively, communicating with open tops 20 and 22, respectively, of containers 12 and 14, which tops 20 and 22 are covered by closeable lids 24 and 26, respectively, bearing handles 28 and 30. It should be noted that lids 24 and 26 can be dispensed with.

Figure 1A:
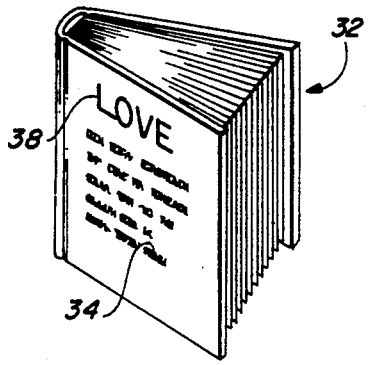
Figure 2A:
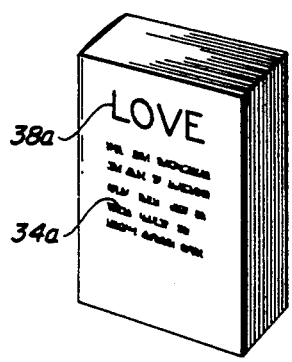
Figure 2D:
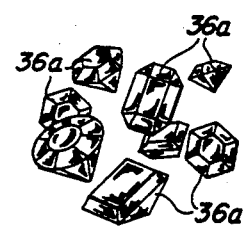
Figure 2B:
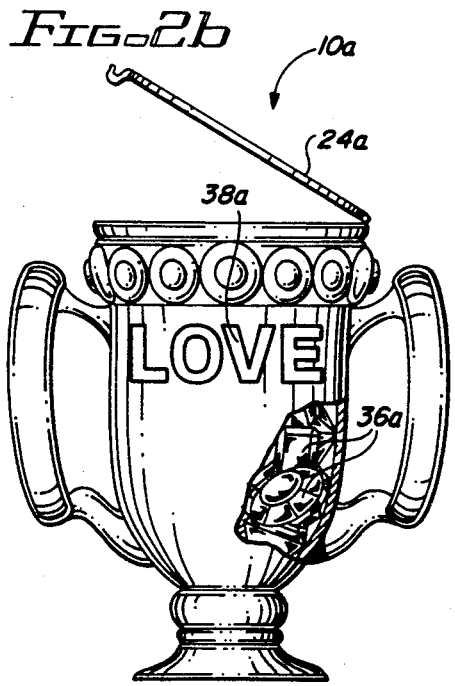
Figure 2C:
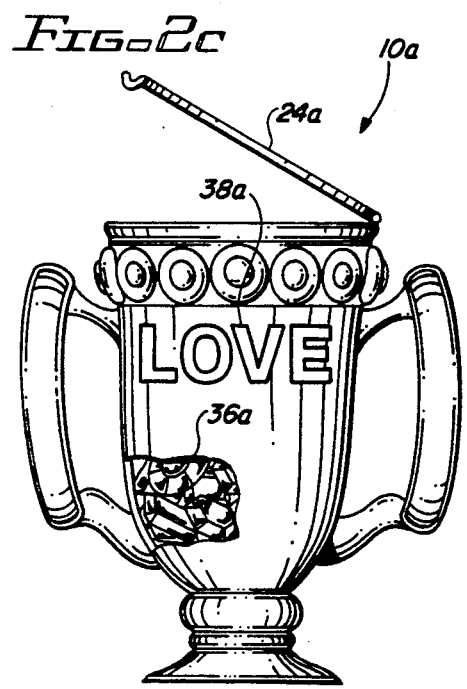

Game 10 also preferably includes a guide booklet 32 (FIG. 1(a)) bearing game instructional indicia 34. Game 10 further includes a plurality of pebbles or stones or other game pieces 36 (FIG. 1(b) and (c)) of about uniform size. Pieces 36 are small enough so that a large number, e.g., 20–40, fit into each of spaces 16 & 18. The total number of pieces 36 is more than would fill space 16 or 18 but not enough to fill both spaces 16 & 18. Each piece 36 may be marked with and bear the word indicia 38 LOVE or LOVER, as may also appear on the exterior of containers 12 & 14 and booklet 32.

Game 10 is played by having the two lovers who play the game first place in spaces 16 & 18 an equal number of pieces 36 and then they may refer to booklet 32 for the game rules. Thereafter, in accordance with the rules, whenever a loving act is carried out by either lover, it is accompanied by a piece 36 from that lover's container 12 or 14, which is then handed to and placed by the recipient lover in his or her container 12 or 14. Sooner or later during play of the game an imbalance in the giving of loving acts may occur and one of containers 12 and 14 may become filled to overflowing. This will then serve as a vivid reminder for the lover with the overflowing container 12 or 14 to carry out more loving acts and simultaneously to transfer more pieces 36 to the other recipient's container.

This method stimulates reciprocal loving acts, such as sexual favors, kisses, a special kindness, such as remembering an anniversary, birthday, St. Valentine's day, or other special occasion with a dinner out, helping around the house, a special present, breakfast in bed or another similar act to stimulate and maintain love. The reciprocal loving acts, in turn, promote harmony, marital bliss, happiness, and emotional, physical and mental well-being, kindness and considerate acts may be rewarded with reciprocal affection. Life is more fully enjoyed. Thus, playing of game 10 benefits both lovers and society in general. Game 10 can and should be played continuously, forming a part of everyday life. Its self-perpetuating nature has no end.

Containers 12 and 14 may be in any suitable size and shape and of any suitable construction. For example, they may be decorated or plain wooden or ceramic, or metal boxes, glass or the like. Pieces 36 may be of stone, wood, ceramic, metal, plastic or the like and preferably are irregular. Booklet 32 may be bound or unbound.

FIG. 2

A second preferred embodiment of the improved lover's game of the present invention is schematically depicted in FIG. 2, views (a), (b), (c), and (d). Thus, game 10a is shown. Components thereof similar to those of game 10 bear the same numerals, but are succeeded by the letter "a".

Game 10a differs from game 10 only in that containers 12a and 14a are in the form of loving cups; lids 24a and 26a are hinged instead of sliding plates, and pieces 36a are in the form of various simulated or synthetic gems or jewels of various types, colors, sizes and shapes. They also do not bear the LOVE indicia 38a which cups 12a and 14a and pamphlet 32a bear. Pieces 36a symbolize the precious nature of the recipients lover of the loving acts. So also do the loving cups 12a and 14a. Game 10a is played identically to game 10 and has the same effects and benefits.

Various modifications, changes, alterations and additions can be made in the improved lover's game of the present invention in its components, and in its method of play. All such modifications, changes, alterations and additons as are within the scope of the appended claims form part of the present invention.

For example, if desired, the containers 12 and 14 could readily be without lids, in which event pieces 36 would be piled up on top of the container until no more could be stacked up, without falling off. Likewise, more than two containers might be used in those cases where sharing of love among many parties, such as in a family of three or more might be involved. In all such cases, the party whose cup is overflowing would be the one who "owes" the most favors.

What is claimed is:

1. An improved method of playing a lover's game, said method comprising:
    a) distributing to two game players designated lovers two open-topped containers of equal size and with central storage spaces of equal size accessible from said open tops, said containers having closeable top lids;
    b) distributing to said two lovers initially an equal number of a plurality of game pieces of sufficiently small size so that a plurality of said pieces can fit within each said space, the total number of said game pieces distributed to said two lovers combined being more than sufficient to fill one of said spaces, but less than the number needed to fill both said spaces, and having said lovers store said game pieces in their container spaces;
    c) initiating play of the game by having a first one of said two lovers pass to the second one of said two lovers a game piece as said first lover carries out a loving act and having said second lover deposit said game piece in the container space of said second lover;
    d) continuing said game with exchanges of said pieces and loving acts until one of said lovers has his or her container space overflowing, as determined by being unable to close the lid of his or her container, whereupon the lover is forced to return one or more loving act to the other lover along with a game piece for each act, at least until said lid is closeable, thereby promoting loving harmony between said two lovers.

2. The improved method of claim 1, wherein said game includes a rules guide and wherein at least one of (a) said plurality of game pieces, (b) said two containers, and (c) said rules guide bear the indicia "LOVER".

3. The improved method of claim 1 wherein said game pieces are of equal size, shape and appearance.

4. The improved method of claim 1 wherein said game pieces are of unequal size, shape and appearance.

5. The improved method of claim 4 wherein said game pieces are simulated jewels of different sizes, shapes and colors.

6. An improved method of playing game for inspiring inter-personal relationships, comprising:
    a) distributing to a plurality of game players an individual container of substantially equal size,
    b) distributing to each game player initially an equal number of a plurality of game pieces, all of which will fit into said container without spilling over, but with the total number of game pieces being of a total volume which exceeds the total volume of a given container and its ability to hold all such pieces without spilling over,
    c) initiating play of the game by having a first player remove one piece from his container, hand it to the second player who will then deposit it in the second player's container after the first player performs a good deed for the second player,
    d) continuing said game until one of the players cannot have a piece placed in his container without over-flowing, because of lack of room therein, whereupon the player is forced to immediately make room by performing a good deed for another player.

7. The game of claim 6 wherein said game includes a rules guide and wherein at least one of (a) said plurality of game pieces, (b) said two containers, and (c) said rules guide bear the indicia "LOVER".

8. The game of claim 6 wherein said game pieces are of equal size, shape and appearance.

9. The game of claim 6 wherein said game pieces are of unequal size, shape and appearance.

10. The game of claim 9 wherein said game pieces are simulated jewels of different sizes, shapes and colors.

* * * * *